United States Patent
Omori et al.

(10) Patent No.: US 10,780,763 B2
(45) Date of Patent: Sep. 22, 2020

(54) VEHICLE AIR CONDITIONING CONTROL METHOD AND VEHICLE AIR CONDITIONING DEVICE

(71) Applicant: Nissan Motor Co., Ltd., Yokohama-shi, Kanagawa (JP)

(72) Inventors: Masahiro Omori, Kanagawa (JP); Takamitsu Hase, Kanagawa (JP); Yasushi Ohmura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/490,927

(22) PCT Filed: Apr. 5, 2017

(86) PCT No.: PCT/JP2017/014220
§ 371 (c)(1),
(2) Date: Sep. 4, 2019

(87) PCT Pub. No.: WO2018/185875
PCT Pub. Date: Oct. 11, 2018

(65) Prior Publication Data
US 2020/0018532 A1  Jan. 16, 2020

(51) Int. Cl.
*B60H 1/32* (2006.01)
*F25B 49/02* (2006.01)

(52) U.S. Cl.
CPC .......... *B60H 1/3216* (2013.01); *B60H 1/32* (2013.01); *B60H 1/3208* (2013.01);
(Continued)

(58) Field of Classification Search
CPC ...... B60H 1/32; B60H 1/3208; B60H 1/3216; B60H 1/3219; B60H 1/322;
(Continued)

(56) References Cited

U.S. PATENT DOCUMENTS

| 7,100,383 B2 * | 9/2006 | Sugesawa | B60H 1/005 62/133 |
| 2002/0069656 A1 | 6/2002 | Niimi | |

(Continued)

FOREIGN PATENT DOCUMENTS

| CN | 102825996 A | 12/2012 |
| CN | 203876529 U | 10/2014 |

(Continued)

*Primary Examiner* — Eric S Ruppert
*Assistant Examiner* — Hans R Weiland
(74) *Attorney, Agent, or Firm* — Global IP Counselors, LLP

(57) ABSTRACT

During control of an air-conditioning for a vehicle, when a torque to the engine is outputted that satisfies a total value of drive torques of the vehicle and an air-conditioning compressor, a minimum discharge capacity is set when fuel to the engine is cut. An assessment is made as to whether or not the discharge capacity needs to be changed from the minimum discharge capacity in accordance with the state inside the cabin. The discharge capacity is changed from the minimum discharge capacity to an upper limit capacity that is allowed during normal operation upon accessing that the discharge capacity needs to be changed from the minimum discharge capacity. After a predetermined time elapses following the changing of the discharge capacity, the discharge capacity is changed from the upper limit capacity to a discharge capacity that corresponds to the state inside the cabin.

5 Claims, 4 Drawing Sheets

(52) U.S. Cl.
CPC ............... *B60H 2001/327* (2013.01); *B60H 2001/3255* (2013.01); *B60H 2001/3275* (2013.01); *F25B 49/022* (2013.01)

(58) Field of Classification Search
CPC ...... B60H 2001/3255; B60H 2001/327; B60H 2001/3275; F25B 49/022
See application file for complete search history.

(56) References Cited

U.S. PATENT DOCUMENTS

| | | | | |
|---|---|---|---|---|
| 2003/0131612 | A1* | 7/2003 | Wakisaka | B60H 1/3222 62/133 |
| 2003/0192326 | A1 | 10/2003 | Masuda et al. | |
| 2005/0066669 | A1 | 3/2005 | Sugesawa et al. | |
| 2006/0272343 | A1* | 12/2006 | Takahashi | B60H 1/3208 62/230 |
| 2012/0000210 | A1* | 1/2012 | Kim | B60H 1/00764 62/61 |
| 2012/0304670 | A1* | 12/2012 | Kumar | F25B 49/022 62/61 |
| 2012/0318015 | A1* | 12/2012 | Motegi | B60H 1/3208 62/230 |
| 2015/0367711 | A1* | 12/2015 | Fuke | B60H 1/00764 62/133 |

FOREIGN PATENT DOCUMENTS

| | | |
|---|---|---|
| EP | 2 535 216 A1 | 12/2012 |
| JP | 1-278832 A | 11/1989 |
| JP | 11-170858 A | 6/1999 |
| JP | 2001-153425 A | 6/2001 |
| JP | 2002-337542 A | 11/2002 |
| JP | 2003-306031 A | 10/2003 |
| JP | 2004-66864 A | 3/2004 |
| JP | 2004-237752 A | 8/2004 |
| JP | 2004-249897 A | 9/2004 |
| JP | 2006-327385 A | 12/2006 |
| JP | 2009-12573 A | 1/2009 |

* cited by examiner

VEHICLE AIR CONDITIONING CONTROL METHOD AND VEHICLE AIR CONDITIONING DEVICE

CROSS-REFERENCE TO RELATED APPLICATIONS

This application is a U.S. national stage application of International Application No. PCT/JP2017/014220, filed on Apr. 5, 2017.

BACKGROUND

Technical Field

The present invention relates to a method for controlling air conditioning for a vehicle provided with a variable-displacement air-conditioning compressor, and to an air-conditioning device for a vehicle.

Background Information

In Japanese Laid-Open Patent Application No. 2004-237752 (Patent Citation 1), when an engine is performing fuel injection stop control (referred to as fuel cutting below) during coasting travel with an acceleration pedal released, a compressor capacity of an air-conditioning compressor is minimized and an engine load is reduced, whereby fuel cutting is carried out to a lower vehicle speed range while any discomfort with a deceleration rate for a driver is minimized.

SUMMARY

However, with the technology of Patent Citation 1, when the minimized compressor capacity is restored to a normal compressor capacity, there is variation in a torque profile of load torque occurring during the change in compressor capacity. It is then difficult to achieve engine torque control that corresponds to the compressor capacity, there is a risk that a vehicle occupant will feel discomfort with deceleration. An object of the present invention is to provide a method for controlling air conditioning for a vehicle and an air-conditioning device for a vehicle, with which stable deceleration can be achieved when the compressor capacity is restored to a normal compressor capacity after having been minimized during fuel cutting.

To achieve the object described above, in the present invention, during control of air-conditioning for a vehicle in which torque satisfying a total value of drive torque of the vehicle and drive torque of an air-conditioning compressor is outputted to an engine, a discharge capacity of the air-conditioning compressor is set to a minimum capacity when fuel of the engine is cut. When it has been assessed that the discharge capacity needs to be changed from the minimum capacity in accordance with a state inside a cabin, the discharge capacity is changed from the minimum capacity to an upper limit capacity allowed during normal operation, and after a predetermined time has elapsed following the change, the discharge capacity is changed from the upper limit capacity to a discharge capacity that corresponds to the state inside the cabin.

Specifically, when the discharge capacity of the air-conditioning compressor is restored from the minimum capacity to a discharge capacity that corresponds to the state inside the cabin, the discharge capacity transitions to the discharge capacity that corresponds to the state inside the cabin after having changed from the minimum capacity to the upper limit capacity; therefore, a torque profile of load torque during the change in compressor capacity can be stabilized, and a stable deceleration rate can be achieved.

DETAILED DESCRIPTION OF THE EMBODIMENTS

Figure 1:
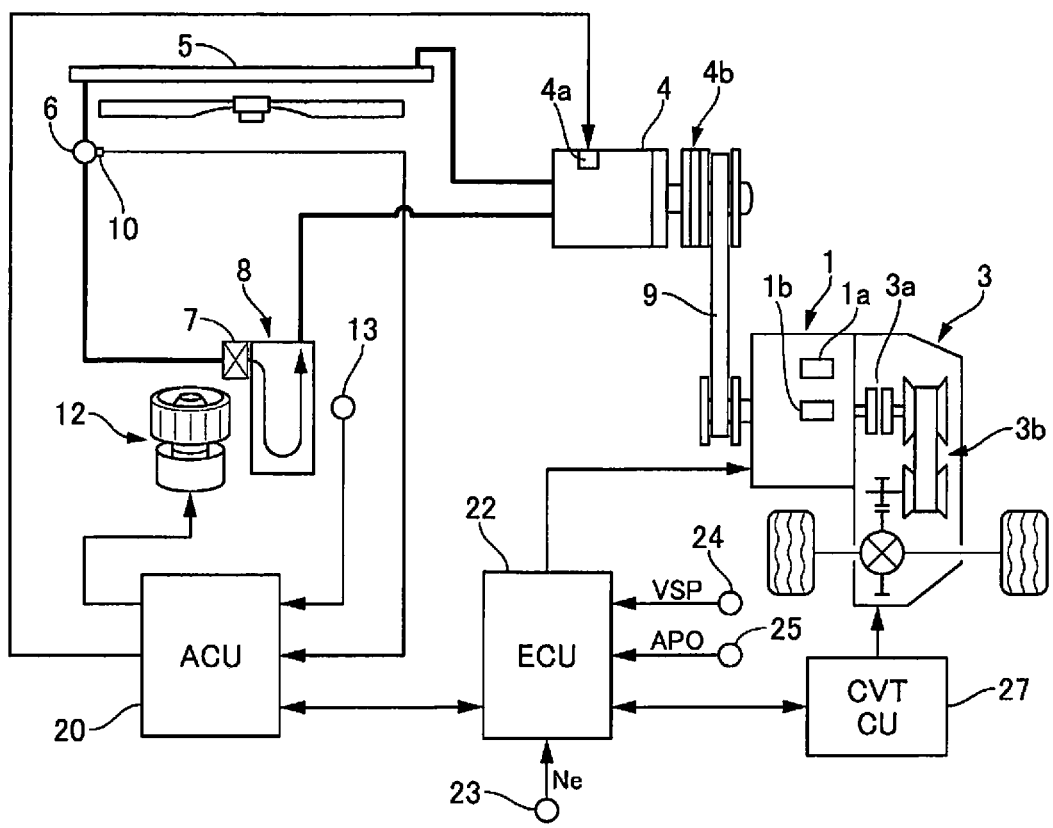
FIG. 1 is a system diagram of a vehicle to which an air-conditioning device is applied to the vehicle in accordance with a first embodiment.

A preferred embodiment for realizing a vehicle air-conditioning control method and a vehicle air-conditioning control device for a vehicle of the present disclosure is described below on the basis of a first embodiment shown in the drawings.

First Embodiment

FIG. 1 is a system diagram of a vehicle to which an air-conditioning device is applied in accordance with first embodiment. Rotation outputted from an engine 1, which is an internal combustion engine, is inputted to an automatic transmission 3. The rotation inputted to the automatic transmission 3 is inputted to a belt-type continuously variable transmission 3b via a torque converter and a lock-up clutch 3a. The lock-up clutch 3a controls transmitted torque capacity on the basis of control hydraulic oil pressure supplied from a control valve (not shown). Rotation changed in speed by the belt-type continuously variable transmission 3b is transmitted to drive wheels via a final gear. The engine 1 has a throttle valve 1a that adjusts intake air quantity and an injector 1b that controls fuel injection quantity.

The air-conditioning device for a vehicle has a variable-capacity compressor 4, a capacitor 5, an expansion valve 7, and an evaporator 8, and constitutes a vapor-compression refrigerant cycle through which a refrigerant is circulated. The compressor 4 is a swashplate/piston-type compressor, and the compressor drives a piston and compresses the refrigerant by rotating a swashplate (not shown) attached at an incline to a rotating shaft. The compressor 4 has a swashplate control valve 4a, and changes a stroke of the piston by changing the incline of the swashplate. A refrigerant discharge capacity of the compressor 4 is thereby controlled. The compressor 4 is driven by the engine 1 via a pulley and a belt 9. The compressor 4 has a clutch 4b, and the compressor 4 is operated and stopped by the opening and closing of the clutch 4b. A swashplate/piston-type is given as an example of the compressor 4 of the first embodiment, but another type may be used as long has the compressor is a variable-capacity type of which the refrigerant discharge capacity can be controlled.

The capacitor 5 is attached to a front part of the vehicle. The capacitor 5 is a cabin-external heat exchanger that uses wind pressure from traveling to chill high-temperature, high-pressure refrigerant compressed by the compressor 4. A receiver/dryer 6, also referred to as a liquid tank, separates the refrigerant into a gas and liquid and removes moisture. The receiver/dryer 6 is provided with a pressure sensor 10 that detects refrigerant pressure at a high-pressure side of the vapor-compression refrigerant cycle.

The expansion valve 7 gasifies high-pressure liquid refrigerant to constant-pressure vapor refrigerant. The evaporator 8 is a cabin-internal heat exchanger that is installed downstream of a blower fan 12 of a cabin-internal air-conditioning duct, and that chills air blown from the blower fan 12. A temperature sensor 13 for detecting a temperature of conditioned air passing through the evaporator 8 is installed downstream of the evaporator 8.

An engine controller 22 (written below as "ECU") calculates a target engine torque Te* on the basis of a requested torque Td corresponding to an acceleration pedal position and a load torque Tc corresponding to an actuating state of the compressor 4. An engine speed sensor 23 detects an engine speed Ne and outputs the engine speed to the ECU. A vehicle speed sensor 24 detects a vehicle speed VSP and outputs the vehicle speed to the ECU. An accelerator position sensor 25 detects a driver's accelerator pedal position APO and outputs the position to the ECU. The ECU controls the throttle valve 1a and injector 1b of the engine 1 to control an operating state (engine speed Ne and engine torque Te) of the engine 1. The ECU carries out fuel cutting to stop fuel injection (details are described hereinafter) when a predetermined condition has been met.

A transmission controller 27 (written below as the CVTCU) receives a range position signal sent from a shift range (not shown), and controls an engaged/disengaged state of the lock-up clutch 3a and a speed change ratio of the belt-type continuously variable transmission 3b. An air-conditioning controller 20, the ECU, and the CVTCU are connected by a CAN communication line through which information can be mutually sent and received.

The air-conditioning controller 20 (written below as the ACU) is a control device that performs air-conditioning control for the cabin interior. The ACU receives a pressure signal detected by the pressure sensor 10 and a temperature signal detected by the temperature sensor 13, and sends and receives various signals (a discharge capacity command value, a pressure signal, etc., for the compressor 4) to and from the engine controller 22 and the transmission controller 27, described hereinafter. Within the ACU, the swashplate control valve 4a and clutch 4b of the compressor 4 are controlled so that a set cabin-internal temperature Tset that has been set by an occupant, etc., is reached.

Fuel Cutting Control Process

Figure 2:
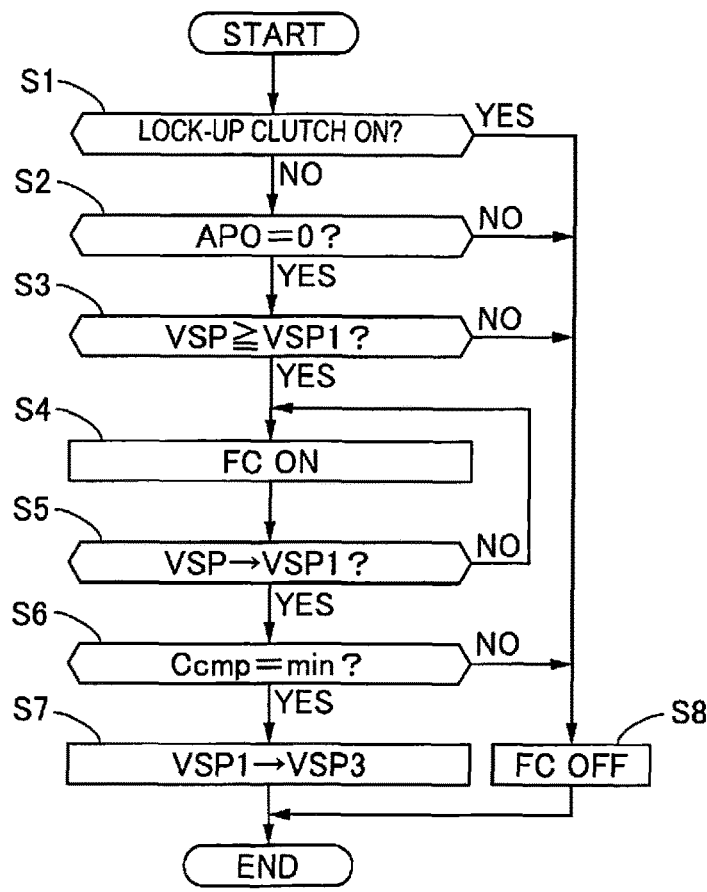
FIG. 2 is a flowchart showing a fuel cutting control process carried out within an ECU of the first embodiment.

FIG. 2 is a flowchart showing a fuel cutting control process carried out in the ECU of the first embodiment.

In step S1, an assessment is made as to whether or not the lock-up clutch 3a is locked up (written also as ON), the process advances to step S2 when the clutch is locked up, and otherwise the process advances to step S8 and fuel cutting (written also as FC below) is set to OFF (fuel injection).

In step S2, an assessment is made as to whether or not the accelerator pedal position APO is 0, the process advances to step S3 when the position is 0, and otherwise the process advances to step S8. Whether or not the APO is 0 may be assessed by the position being at or below a predetermined value, at which it can be assessed that the driver has essentially released the acceleration pedal.

In step S3, an assessment is made as to whether or not the vehicle speed VSP is at or above a first vehicle speed VSP1 at which FC is allowed. When the vehicle speed is at or above VSP1, the process advances to step S4, and otherwise the process advances to step S8.

In step S4, FC is carried out (written also as ON).

In step S5, an assessment is made as to whether or not the vehicle speed VSP has reached the first vehicle speed VSP1. When it has, the process advances to step S6, and otherwise the process returns to step S4 and FC is continued.

In step S6, an assessment is made as to whether or not a discharge capacity Ccmp of the compressor 4 received from the ACU is a minimum capacity min. When the capacity is the minimum capacity min, the process advances to step S7, and otherwise the process advances to step S8.

In step S7, the first vehicle speed VSP1 is changed to a third vehicle speed VSP3, which is lower than the first vehicle speed VSP1.

In step S8, FC is set to OFF and fuel injection is performed.

Compressor Discharge Capacity Control During Fuel Cutting Control

The ECU performs fuel cutting when the vehicle is decelerating in order to improve fuel consumption. In the vehicle of the first embodiment, when the compressor 4 is inactive, fuel cutting can be carried out up to a low vehicle speed of, for example, 25 km/h. At this time, the lock-up clutch 3a is engaged and the decrease of the engine speed Ne is minimized, thereby preventing an engine stall. While fuel cutting is being performed, friction of the engine 1 or motive power for causing an alternator (not shown) to rotate acts in a direction by which the vehicle is decelerated via the lock-up clutch 3a. Consequently, the rate of deceleration of the vehicle is greater than when fuel cutting is not being performed. When the air-conditioning compressor 4 actuates in this state, the rate of deceleration of the vehicle is further increased by motive power for driving the compressor 4.

Generally, when the acceleration pedal and the brake pedal are both released while the vehicle is traveling, the vehicle slowly decelerates (written also as coasting travel below) due to engine braking. This engine braking includes, in addition to the friction of the engine 1, motive power that rotates the alternator and the compressor 4. Consequently, when the rate of deceleration of the vehicle during coasting travel is too great regardless of the brake pedal not being pressed, it is uncomfortable for the occupant. Therefore, during coasting travel, the rate of deceleration is preferably to an extent that is not uncomfortable for the occupant (this rate is written also below as the deceleration rate upper limit). It is known that the deceleration rate upper limit in this case is preferably smaller at lower vehicle speeds.

However, in a vehicle equipped with an automatic transmission such as a stepped automatic transmission or a belt-type continuously variable transmission, when fuel cutting is performed during coasting travel, either the deceleration rate does not change in accordance with the vehicle speed, or there is a tendency for the deceleration rate to increase at lower vehicle speeds. During coasting travel at a speed of, for example, 45 km/h or more in a vehicle equipped with an automatic transmission, even when fuel cutting is performed, the deceleration rate of the vehicle does not exceed the deceleration rate upper limit and a pump load of the engine 1 can be minimized to an extent such that the pump load is controlled by controlling the throttle valve position. However, when the vehicle speed decreases to VSP1 (e.g., about 35 km/h) and there is a deceleration rate equal to or greater than that of a high vehicle speed, the deceleration rate will exceed the upper limit and the occupant will feel uncomfortable. Consequently, a fuel cutting recover is performed, in which fuel injection is restarted at VSP1 (written also as the recover vehicle speed below), which is a vehicle speed at which the actual deceleration rate of the vehicle and the deceleration rate upper limit coincide. In other words, when the compressor 4 is actuating, fuel cutting cannot be performed at a vehicle speed equal to or less than VSP1, and fuel consumption cannot be improved. In view of this, the discharge capacity of the compressor 4 is minimized and the deceleration rate of the vehicle is controlled so as to not exceed the deceleration rate upper limit. In the first embodiment, the discharge capacity of the compressor 4 is set to the minimum capacity min. When the discharge capacity of the compressor 4 is the minimum capacity min, in fuel cutting control, the vehicle speed is changed from VSP1 to VSP3 and fuel cutting is carried out to a lower vehicle speed.

Problems when Restoring From Minimum Capacity to Control Discharge Capacity

The following is a description of a scenario in which after the discharge capacity of the compressor 4 (written also as Ccmp below) has been set to the minimum capacity min, a control state is restored to a state that is in effect during normal travel (a discharge capacity corresponding to the state within the cabin (written as the control discharge capacity Cmp(con) below)). In the ACU, during normal travel, a target control discharge capacity of the compressor 4 is calculated and a control discharge capacity con is outputted to the swashplate control valve 4a on the basis of the detected pressure signal, so that the temperature detected by the temperature sensor 13 reaches the set cabin-internal temperature Tset.

Assuming a case in which the capacity is changed from the minimum capacity min to the control discharge capacity con, the load torque Tc of the compressor 4 is changed from a load torque Tc(min) corresponding to the minimum capacity min to a load torque Tc(con) corresponding to Ccmp (con). At this time, even if the swashplate control valve 4a of the compressor 4 is controlled, a change-over-time locus (torque profile below) of the load torque Tc during the transition from Tc(min) to Tc(con) will not be sufficiently stable. Engine torque control is performed with the load torque Tc of the compressor 4 taken into account; therefore, when the torque profile varies, a value obtained from subtracting the load torque Tc from the engine torque Te varies, the torque transmitted to the drive wheels cannot be stabilized, and there is a risk of the deceleration rate fluctuating and the driver feeling uncomfortable.

In the first embodiment, when the discharge capacity is restored from the minimum capacity min to the normal Ccmp(con), Ccmp is temporarily set to an upper limit capacity max, after which the capacity transitions to Ccmp (con). This is because there are very few variations in the torque profile during the transition from the minimum capacity min to the upper limit capacity max, and the control stability of the compressor 4 is satisfactory. Even during engine torque control, when Ccmp has been set to min or max, the load torque Tc is calculated on the basis of max, and when Ccmp has been set to Ccmp(con), the load torque Tc is calculated on the basis of a pressure signal Pd, as is done during normal control.

Engine Torque Control Process

Figure 3:
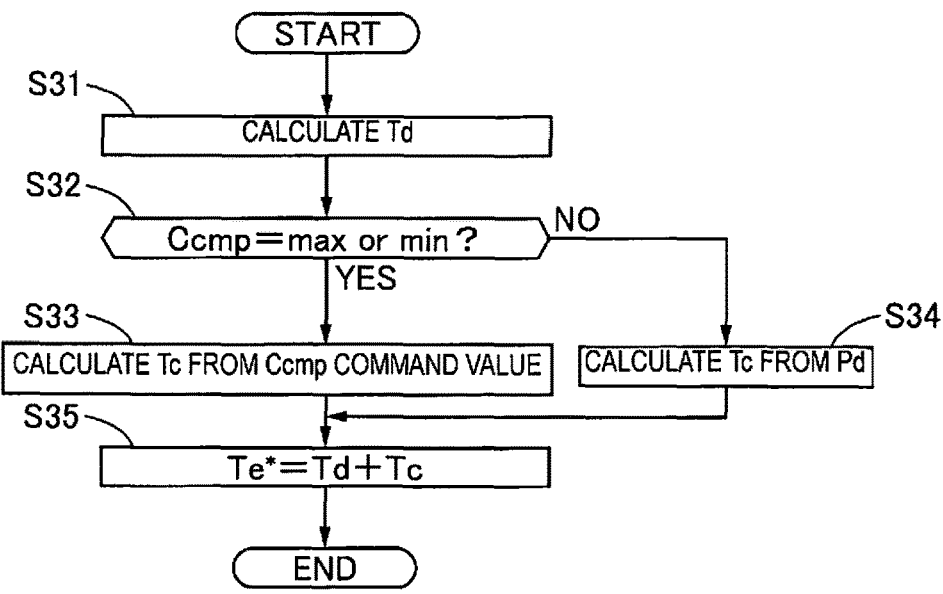
FIG. 3 is a flowchart showing an engine torque control process carried out within the ECU of the first embodiment.

FIG. 3 is a flowchart showing an engine torque control process carried out in the ECU of the first embodiment.

In step S31, a torque Td requested by the driver is calculated on the basis of the acceleration pedal position APO.

In step S32, a discharge capacity command value is read from the ACU, an assessment is made as to whether or not the discharge capacity Ccmp of the compressor 4 is either at the upper limit capacity max allowed during normal operation or at the minimum capacity min, and when the capacity is either max or min, the process advances to step S33, otherwise the process advances to step S34.

In step S33, the load torque Tc generated in the compressor 4 is calculated on the basis of the discharge capacity command value (max or min).

In step S34, the pressure signal Pd detected from the ACU by the pressure sensor 10 is read, and the load torque Tc generated in the compressor 4 is calculated on the basis of the pressure signal Pd.

In step S35, a target engine torque Te* is calculated from a total value combining the requested torque Td and the load torque Tc, and the throttle valve position and fuel injection amount are controlled so that the engine torque Te reaches the target engine torque Te*.

Compressor Capacity Control Process

Figure 4:
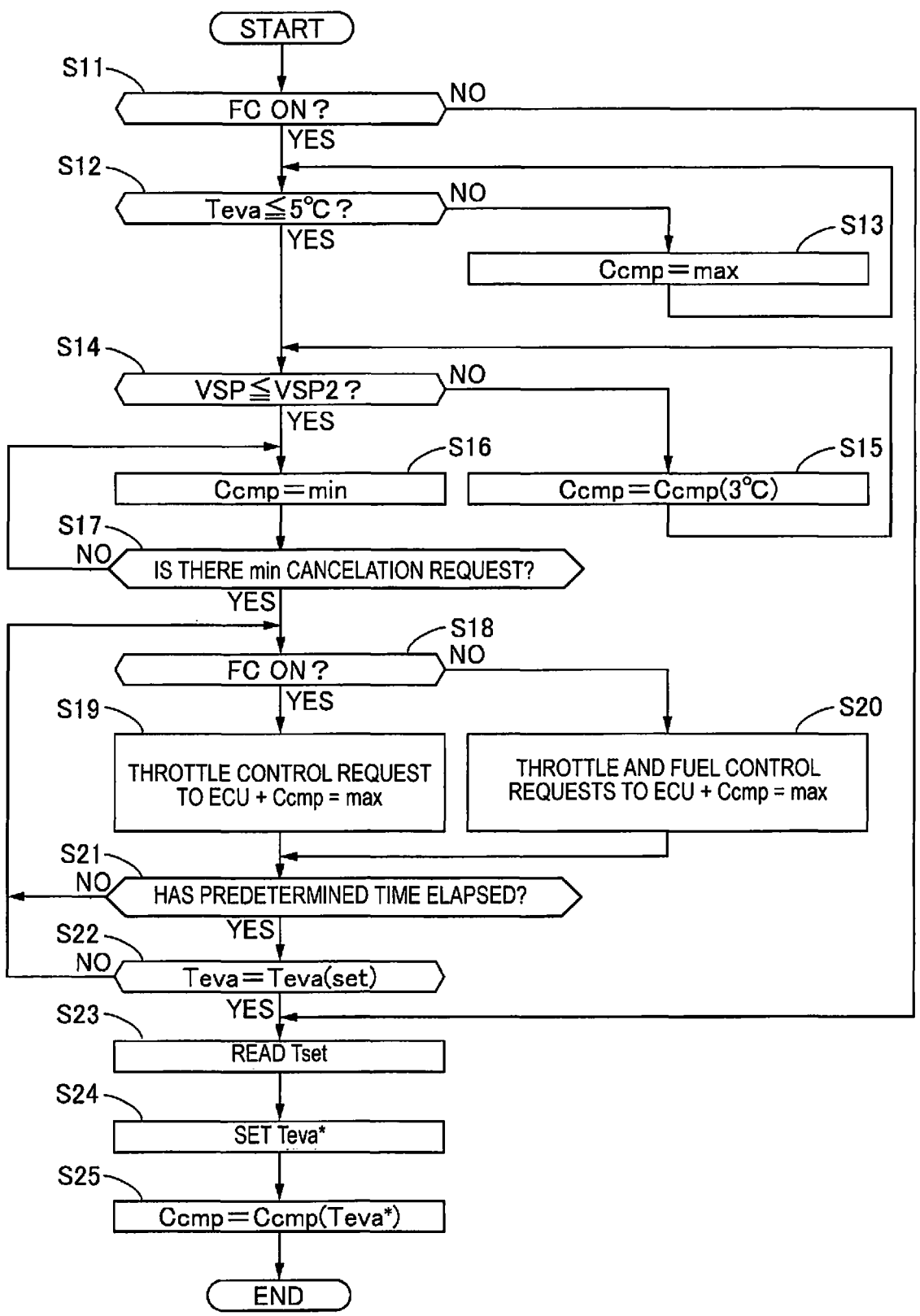
FIG. 4 is a flowchart showing a compressor capacity control process carried out by an ACU of the first embodiment.

FIG. 4 is a flowchart showing a compressor capacity control process carried out by the ACU of the first embodiment.

In step S11, an assessment is made as to whether or not FC is ON (fuel cutting is in effect), the process advances to step S12 when FC is ON, and otherwise the process advances to step S22.

In step S12, an assessment is made as to whether or not an evaporator temperature Teva detected by the temperature sensor 13 is 5° C. or less. When this temperature is 5° C. or less, the process advances to step S14, and otherwise the process advances to step S13.

In step S13, the discharge capacity Ccmp of the compressor 4 is set to the upper limit capacity max, and remains there until Teva reaches 5° C. or less.

In step S14, an assessment is made as to whether or not the vehicle speed VSP is equal to or less than a vehicle speed VSP2 (e.g., 45 km/h) at which a deceleration rate is attained that does not exceed the deceleration rate upper limit which causes discomfort to the occupant. When the vehicle speed is equal to or less than VSP2, the process advances to step S16, and otherwise the process advances to step S15.

In step S15, Ccmp is set to a discharge capacity Ccmp (3° C.) at which Teva can be maintained at 3° C., and remains there until VSP reaches VSP2. As a consequence, no discomfort is caused to the occupant, and it is possible to increase a length of time during which a cooling capability can be ensured even if the discharge capacity is thereafter set to the minimum capacity min.

In step S16, Ccmp is set to the minimum capacity min.

In step S17, Teva is equal to or greater than a temperature Teva(set) that corresponds to the set cabin-internal temperature, and an assessment is made as to whether or not there is a request to cancel the minimum capacity min based on a cooling performance request. When there is a cancelation request, the process advances to step S18, and otherwise the minimum capacity min is continued.

In step S18, an assessment is made as to whether or not FC is ON. The process advances to step S19 when FC is ON, and otherwise the process advances to step S20.

In step S19, Ccmp is set to the upper limit capacity max, and a throttle valve control request is outputted to the ECU. Specifically, FC is being carried out and the fuel injection amount cannot be controlled; therefore, the proportion of torque that increases when Ccmp reaches the upper limit capacity max is ensured by controlling the throttle valve position to open further and reducing the pump load of the engine 1.

In step S20, Ccmp is set to the upper limit capacity max, and requests for throttle valve control and fuel injection control are outputted to the ECU. Specifically, FC is not being carried out, and fuel injection has been restarted; therefore, the proportion of torque that increases when Ccmp reaches the upper limit capacity max is ensured by increasing the engine torque through throttle valve position control and fuel injection control.

In step S21, an assessment is made as to whether or not a predetermined time has elapsed since Ccmp was set to the upper limit capacity max. When the predetermined time has elapsed, the process advances to step S22, and otherwise the process returns to step S18 and the upper limit capacity max is continued. The predetermined time in this embodiment is a time during which an actual load torque of the compressor 4 can reach a load torque Tc(max) that corresponds to the upper limit capacity max when Ccmp has been changed from the minimum capacity min to the upper limit capacity max.

In step S22, an assessment is made as to whether or not the evaporator temperature Teva has reached the temperature Teva(set) that corresponds to the set cabin-internal temperature Tset. When Teva has reached Teva(set), it is assessed that the loss of air-conditioning performance while Ccmp had been at the minimum capacity min is recouped and the process advances to step S23, and when Teva has not reached Teva(set), the process returns to step S18 and the upper limit capacity max is continued.

In step S23, the set cabin-internal temperature Tset that was set by the occupant is read.

In step S24, the target evaporator temperature Teva* that corresponds to the set cabin-internal temperature Tset is set.

In step S25, on the basis of the target evaporator temperature Teva* and the detected evaporator temperature Teva, Ccmp is set to a discharge capacity Ccmp(Teva*) that corresponds to Teva*. Steps S23 to S25 are a normal compressor capacity control process.

Figure 5:
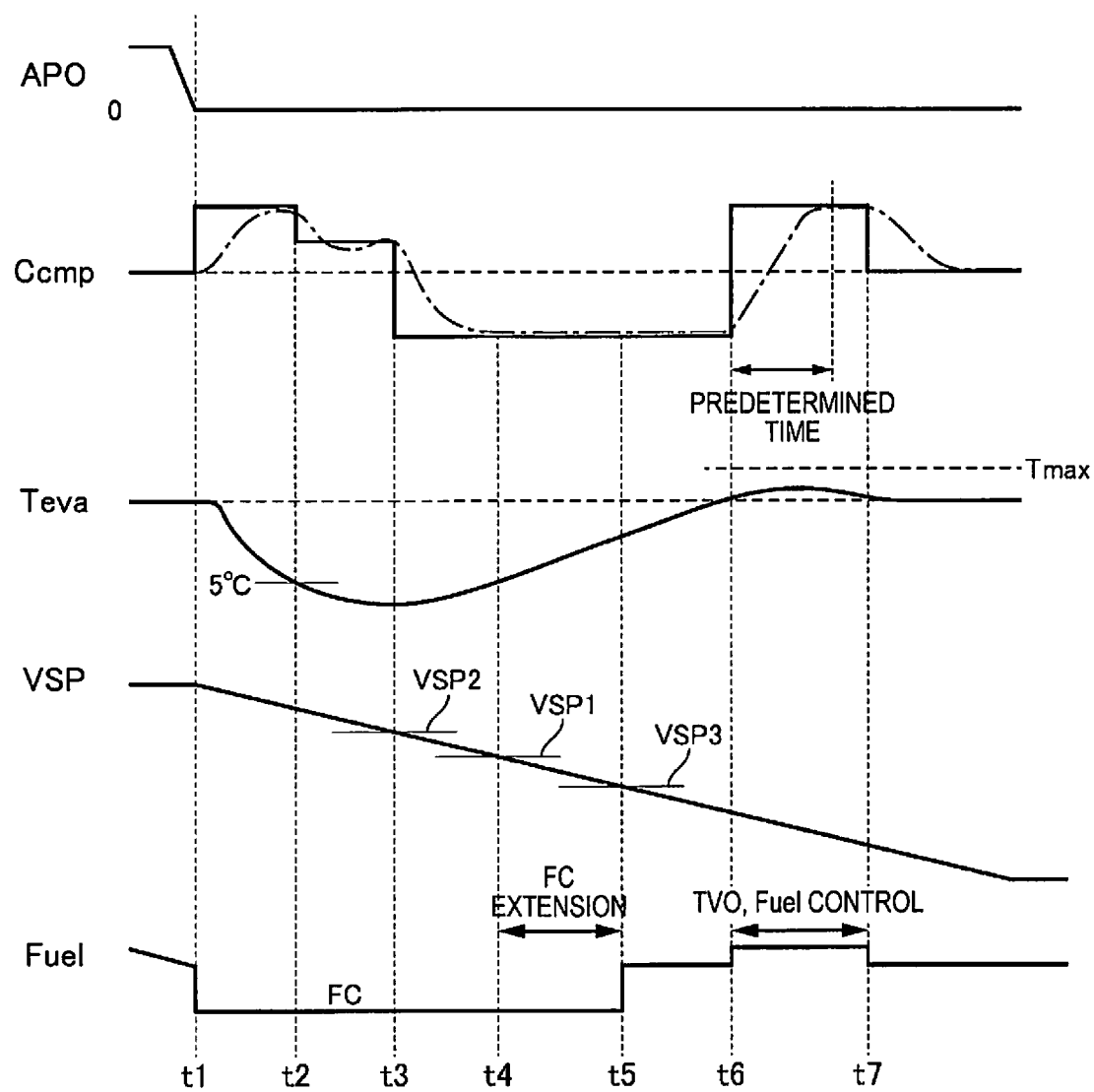
FIG. 5 is a time chart showing the compressor capacity control process of the first embodiment.

FIG. 5 is a time chart showing the compressor capacity control process of the first embodiment. This time chart begins from a state in which the lock-up clutch 3a is locked up, the driver is pressing the acceleration pedal, and the vehicle is traveling while being driven.

At time t1, APO is 0, and FC is initiated when the vehicle is assessed to be in coasting travel with the vehicle speed VSP higher than VSP1. At the same time, Teva is 5° C. or higher; therefore, Ccmp is set to the upper limit capacity max and the evaporator temperature is reduced at once.

At time t2, when Teva falls below 5° C., Ccmp is set to Ccmp(3° C.), the evaporator temperature is maintained at 3° C., and a chilling capability is ensured.

At time t3, when the vehicle speed VSP reaches VSP2, Ccmp is set to the minimum capacity min and the load torque Tc is abated. A surpassing of the deceleration rate upper limit can thereby be avoided, and the recover vehicle speed VSP1 for FC is therefore changed to the lower vehicle speed VSP3. Consequently, the interval indicated from t4 to t5 of the time chart is an interval in which FC can be extended by setting the discharge capacity to the minimum capacity min. In the interval from time t1 to t3, the evaporator temperature Teva is sufficiently lowered, and the chilling capability can be ensured even if the discharge capacity is set to the minimum capacity min.

At time t5, when the vehicle speed VSP reaches VSP3, FC is ended and fuel injection is restarted.

At time t6, when the evaporator temperature Teva is equal to or greater than the temperature Teva(set) that corresponds to the set cabin-internal temperature Tset, the minimum capacity min is canceled because the cooling capability must be ensured. Ccmp is set to the upper limit capacity max, and a timer begins to count up. At this time, the torque profile of the load torque Tc rises in a stable torque profile from the load torque of the minimum capacity min to the load torque of the upper limit capacity max. Consequently, a load torque value deviating only a small amount from the actual load torque can be calculated by calculating the load torque Tc along this torque profile. When the engine 1 is controlled with the target engine torque Te* as an objective, the proportion of increase in the load torque Tc can be appropriately absorbed and destabilization of the deceleration rate can be avoided by controlling the throttle valve position and the fuel injection amount (TVO and Fuel control in FIG. 5). Tmax in FIG. 5 is a dehumidification request value (e.g., 13° C.), and when the evaporator temperature Teva equal to or greater than this value is reached, Tmax is set on the basis of the fact that odor, etc., becomes a problem. Teva being equal to or greater than Tmax indicates that this problem is avoided in any case.

At time t7, the timer count value is after the elapse of the predetermined time, and when Teva reaches the temperature Teva(set) that corresponds to the set cabin-internal temperature, Ccmp is switched to Ccmp(con), the throttle valve position control and fuel injection amount control that correspond to the upper limit capacity max are ended, and control transitions to normal control. Thus, Ccmp is set to the upper limit capacity max, whereby the cooling performance can be quickly recouped along with the stabilization of the torque profile, and preparation for carrying out the next FC extension can be quickly achieved.

As described above, in the first embodiment, the actions and effects listed below are achieved.

(1) In the controlling of air-conditioning for a vehicle, in which a compressor 4 (air-conditioning compressor) driven by the engine 1 and capable of changing the discharge capacity Ccmp is provided and Ccmp is adjusted in accordance with the state inside the cabin, the target engine torque Te* that satisfies the total value of the requested torque Td (drive torque of the vehicle) and the load torque Tc (drive torque of the air-conditioning compressor) is outputted to the engine 1. When the fuel to the engine 1 is cut, Ccmp is set to the minimum capacity min, an assessment is made in step S17 as to whether or not Ccmp needs to be changed from the minimum capacity min in accordance with the state inside the cabin, and when it is assessed that Ccmp needs to be changed from the minimum capacity min, Ccmp is changed from the minimum capacity min to the upper limit capacity max allowed during normal operation. After the elapse of a predetermined time following this change, Ccmp is changed from the upper limit capacity max to the discharge capacity Ccmp(con) that corresponds to the state inside the cabin. Consequently, the torque profile of the load torque Tc can be stabilized, and the occupant's discomfort with the deceleration rate can be reduced.

(2) The predetermined time is a time during which torque fluctuation of the load torque Tc (drive torque of the air-conditioning compressor) stabilizes. Torque fluctuation caused by mechanical response lag in the compressor 4 can be stabilized by allowing the predetermined time to elapse.

(3) In steps S21 and S22, after the predetermined time has elapsed, when it is assessed that the air-conditioning performance loss during the time Ccmp was at the minimum capacity min has been recouped, Ccmp is changed from the upper limit capacity max to Ccmp(con). Consequently, the cooling performance can be quickly recouped, and preparation for carrying out the next FC extension can be quickly achieved.

Other Embodiments

The present invention was described above on the basis of examples, but the specific configuration may be another configuration. In the first embodiment, the belt-type continuously variable transmission 3b is employed as the transmission, but another form of transmission may be used. Additionally, in the first embodiment, throttle control is requested when there is a min cancelation request while FC is being carried out, but there is no particular need to send a request if the deceleration rate upper limit is not exceeded.

The invention claimed is:

1. A vehicle air-conditioning control method for a vehicle having an air-conditioning compressor that is driven by an engine and configured such that a discharge capacity of the air-conditioning compressor can be changed so as to be adjusted in accordance with a state inside a cabin, the vehicle air-conditioning control method comprising:
   outputting a torque to the engine that satisfies a total value of a drive torque of the vehicle and a drive torque of the air-conditioning compressor; and
   while the vehicle is moving in a state of deceleration,
      setting a minimum capacity of the discharge capacity when fuel to the engine is cut;
      assessing whether or not the discharge capacity needs to be changed from the minimum capacity in accordance with the state inside the cabin;
      changing the discharge capacity from the minimum capacity to an upper limit capacity allowed during normal operation upon accessing that the discharge capacity needs to be changed from the minimum capacity; and
      after a predetermined time elapses following the changing of the discharge capacity, changing the discharge capacity from the upper limit capacity to a discharge capacity that corresponds to the state inside the cabin.

2. A vehicle air-conditioning control method for a vehicle having an air-conditioning compressor that is driven by an engine and configured such that a discharge capacity of the air-conditioning compressor can be changed so as to be adjusted in accordance with a state inside a cabin, the vehicle air-conditioning control method comprising:
   outputting a torque to the engine that satisfies a total value of a drive torque of the vehicle and a drive torque of the air-conditioning compressor;
   setting a minimum capacity of the discharge capacity when fuel to the engine is cut;
   assessing whether or not the discharge capacity needs to be changed from the minimum capacity in accordance with the state inside the cabin;
   changing the discharge capacity from the minimum capacity to an upper limit capacity allowed during normal operation upon accessing that the discharge capacity needs to be changed from the minimum capacity; and
   after a predetermined time elapses following the changing of the discharge capacity, changing the discharge capacity from the upper limit capacity to a discharge capacity that corresponds to the state inside the cabin,
   the predetermined time corresponding to a time to take for stabilizing torque fluctuation of the drive torque of the air-conditioning compressor.

3. The vehicle air-conditioning control method according to claim 1, wherein
   the changing of the discharge capacity from the upper limit capacity to the discharge capacity that corresponds to the state inside the cabin is performed after the predetermined time has elapsed and upon assessing that an evaporator temperature has reached a prescribed temperature.

4. A vehicle air-conditioning device for a vehicle comprising an air-conditioning compressor that is driven by an engine and configured such that a discharge capacity of the air conditioning compressor can be changed, and in which the engine is requested to output a torque that satisfies a total value of drive torque of the vehicle and drive torque of the air-conditioning compressor, the vehicle air-conditioning device comprising:
   a controller that adjusts the discharge capacity in accordance with a state inside a cabin,
   the controller being programmed such that while the vehicle is moving in a state of deceleration,
      the controller sets the discharge capacity to a minimum capacity upon detection of fuel to the engine being cut;
      the controller makes an assessment as to whether or not the discharge capacity needs to be changed from the minimum capacity in accordance with the state inside the cabin;
      upon assessing that the discharge capacity needs to be changed from the minimum capacity, the controller changes the discharge capacity from the minimum capacity to an upper limit capacity allowed during normal operation; and
      after a predetermined time elapses, the controller changes the discharge capacity from the upper limit capacity to a discharge capacity that corresponds to the state inside the cabin.

5. The vehicle air-conditioning control method according to claim 2, wherein
   the changing of the discharge capacity from the upper limit capacity to the discharge capacity that corresponds to the state inside the cabin is performed after the predetermined time has elapsed and upon assessing that an evaporator temperature has reached a prescribed temperature.

* * * * *